US006894601B1

(12) United States Patent
Grunden et al.

(10) Patent No.: US 6,894,601 B1
(45) Date of Patent: May 17, 2005

(54) SYSTEM FOR CONDUCTING WIRELESS COMMUNICATIONS BETWEEN A VEHICLE COMPUTER AND A REMOTE SYSTEM

(75) Inventors: Michael T. Grunden, Columbus, IN (US); Jay Verner, N. Charleston, SC (US); Christopher S. York, Greenwood, IN (US); Gregory P. Murphy, Columbus, IN (US)

(73) Assignee: Cummins Inc., Columbus, IN (US)

( * ) Notice: Subject to any disclaimer, the term of this patent is extended or adjusted under 35 U.S.C. 154(b) by 746 days.

(21) Appl. No.: 09/173,991

(22) Filed: Oct. 16, 1998

(51) Int. Cl.[7] .......................... H04Q 1/00; G05B 19/00

(52) U.S. Cl. ................ 340/10.41; 340/5.72; 340/426.1; 307/10.2; 307/9.1

(58) Field of Search ............................ 340/426, 870.01, 340/10.41, 431; 701/33; 307/10.2, 9.1

(56) References Cited

U.S. PATENT DOCUMENTS

| | | | | |
|---|---|---|---|---|
| 4,688,026 | A | | 8/1987 | Scribner et al. |
| 4,691,801 | A | * | 9/1987 | Mann et al. ................ 340/426 |
| 4,728,922 | A | | 3/1988 | Christen et al. |
| 4,739,328 | A | | 4/1988 | Koelle et al. |
| 4,797,948 | A | | 1/1989 | Milliorn et al. |
| 4,804,937 | A | | 2/1989 | Barbiaux et al. |
| 4,897,642 | A | | 1/1990 | DiLullo et al. |
| 4,926,331 | A | | 5/1990 | Windle et al. |
| 4,939,652 | A | | 7/1990 | Steiner |
| 5,025,253 | A | | 6/1991 | DiLullo et al. |
| 5,030,807 | A | | 7/1991 | Landt et al. |
| 5,055,459 | A | | 10/1991 | Andersson et al. |

(Continued)

OTHER PUBLICATIONS

Hughes, "To Link To Merge To Join To Unite," Hughes TMS Vehicle to Roadside Communications (VRC).

Schoenian, Richard J., "CVO Vehicle–to–Roadside Communications Applications," SAE Technical Paper Series, 952681 pp. 1–6.

*Primary Examiner*—Brian Zimmerman
(74) *Attorney, Agent, or Firm*—Barnes & Thornburg

(57) ABSTRACT

A system for conducting wireless communications between a vehicle computer and a remote system includes a passive radio frequency tag attached to a vehicle and electrically connected to at least one vehicle computer via an information bus, and a tag interface unit electrically connected to a remote computer system. The remote system is operable to control communications with one or more of the vehicle computers via a radio frequency link established between the tag and tag interface unit. The tag preferably includes a microprocessor-based computer electrically connected to the information bus, wherein the tag computer operates as a gateway for communications between the remote computer and any of the onboard vehicle computers including a vehicle/engine control computer, an interface module computer and a transmission control computer. The system preferably includes means for notifying the vehicle operator of various statuses of the communications being conducted, wherein the remote system is operable to control such notifying means.

17 Claims, 3 Drawing Sheets

U.S. PATENT DOCUMENTS

| | | | | | |
|---|---|---|---|---|---|
| 5,055,659 | A | | 10/1991 | Hendrick et al. | |
| 5,058,044 | A | | 10/1991 | Stewart et al. | |
| 5,085,044 | A | | 2/1992 | Freier, Jr. et al. | |
| 5,113,344 | A | | 5/1992 | Kellogg et al. | |
| 5,229,648 | A | * | 7/1993 | Sues et al. | 307/10.2 |
| 5,250,761 | A | | 10/1993 | Koyanagi | |
| 5,257,190 | A | | 10/1993 | Crane | |
| 5,289,378 | A | | 2/1994 | Miller et al. | |
| 5,442,553 | A | | 8/1995 | Parrillo | |
| 5,445,347 | A | | 8/1995 | Ng | |
| 5,450,321 | A | | 9/1995 | Crane | |
| 5,485,520 | A | | 1/1996 | Chaum et al. | |
| 5,515,053 | A | | 5/1996 | Hecht et al. | |
| 5,515,953 | A | | 5/1996 | Tamura et al. | |
| 5,559,505 | A | * | 9/1996 | McNair | 340/5.28 |
| 5,573,610 | A | | 11/1996 | Koch et al. | |
| 5,573,611 | A | | 11/1996 | Koch et al. | |
| 5,666,101 | A | | 9/1997 | Cazzani et al. | |
| 5,693,985 | A | * | 12/1997 | Gee et al. | 307/9.1 |
| 5,737,710 | A | | 4/1998 | Anthonyson | |
| 5,831,519 | A | * | 11/1998 | Pedersen et al. | 340/431 |
| 5,838,251 | A | * | 11/1998 | Brinkmeyer | 340/426 |
| 5,886,634 | A | * | 3/1999 | Muhme | 340/5.31 |
| 5,963,146 | A | * | 10/1999 | Johnson | 340/870.01 |
| 5,999,091 | A | * | 12/1999 | Wortham | 340/431 |
| 6,025,776 | A | * | 2/2000 | Matsuura | 701/33 |
| 6,055,468 | A | * | 4/2000 | Kaman | 701/33 |
| 6,061,614 | A | * | 5/2000 | Carrender | 701/33 |
| 6,094,609 | A | * | 7/2000 | Arjomand | 701/33 |

* cited by examiner

SYSTEM FOR CONDUCTING WIRELESS COMMUNICATIONS BETWEEN A VEHICLE COMPUTER AND A REMOTE SYSTEM

FIELD OF THE INVENTION

The present invention relates generally to systems for conducting wireless communications, and more specifically to such systems operable to conduct communications between an embedded vehicle computer and a remote system.

BACKGROUND OF THE INVENTION

Computer controlled systems for managing the overall operation of an internal combustion engine and other vehicle systems are commonplace. Such systems are typically operable to control engine/vehicle operation based on various engine/vehicle operating parameters and to further collect operating and diagnostic information. Many modern day vehicles include multiple computer-based systems operable to control and manage various engine/vehicle subsystems.

Service/recalibration tools for programming one or more of the onboard vehicle computers are known. Such tools may be connected directly to a suitable I/O port of any of the vehicle computers for extracting information therefrom and providing programming and calibration data thereto. Alternatively, one or more of the onboard computers may be connected to a common information bus such as a SAE J1708 and/or SAE J1939 datalink, wherein a service/recalibration tool may be connected to an appropriate one of the information buses to exchange data with one or more of the onboard computers.

In the heavy duty trucking industry in particular, information relating to the efficiency of operation of the internal combustion engine and other vehicle systems is of paramount concern and many diagnostic systems have been developed for extracting and analyzing such data. Presently, however, such diagnostic systems typically involve connecting a service/recalibration tool to one or more of the onboard computers, extracting appropriate data, and then downloading the collected data to an appropriate data analysis routine. What is therefore needed is more efficient data extraction/analysis system that reduces data extraction times and minimizes user involvement.

SUMMARY OF THE INVENTION

The foregoing shortcomings of the prior art are addressed by the present invention. In accordance with one aspect of the present invention, a method of communicating with a computer embedded within a vehicle and coupled to a radio frequency tag via a remote computer coupled to a tag interface unit, comprising the steps of controlling a tag interface unit to produce a radio frequency field thereabout, monitoring the tag interface unit for an acknowledgement provided by a tag disposed within the radio frequency field produced by the tag interface unit, establishing a radio frequency communications link between the tag interface unit and the tag in response to the acknowledgement provided by the tag, extracting via the radio frequency communications link data from a computer embedded within a vehicle and electrically connected to the tag and controlling via the radio frequency communications link at least one visual indication device associated with the vehicle to thereby notify an operator of the vehicle of a status of communications conducted over the radio frequency communications link.

In accordance with another aspect of the present invention, a system for conducting wireless communications between a remote system and a computer embedded within a vehicle comprise a first computer embedded within a vehicle, a communications tag associated with the vehicle and having a second computer electrically connected to the first computer, a tag interface unit configured for radio frequency communications with the second computer, a remote computer electrically connected to the tag interface unit, the remote computer operable to establish a radio frequency communications link between the tag interface unit and the second computer, the remote computer further operable to exchange information with the first computer via the radio communications link, and means associated with the vehicle and responsive to notification commands provided by the remote computer via the radio communications link to notify an operator of the vehicle of at least one status relating to communications between the remote computer and one of the first and second computers.

One object of the present invention is to provide a system for conducting wireless communications between a vehicle computer and a remote system.

Another object of the present invention is to provide such a system wherein the remote system is operable to control such communications.

A further object of the present invention is to provide such a system wherein the remote system is operable to control operator notification devices to thereby provide the vehicle operator with one or more statuses relating to the communications between the remote system and the vehicle computer.

These and other objects of the present invention will become more apparent from the following description of the preferred embodiment.

DESCRIPTION OF THE PREFERRED EMBODIMENT

Figure 1:
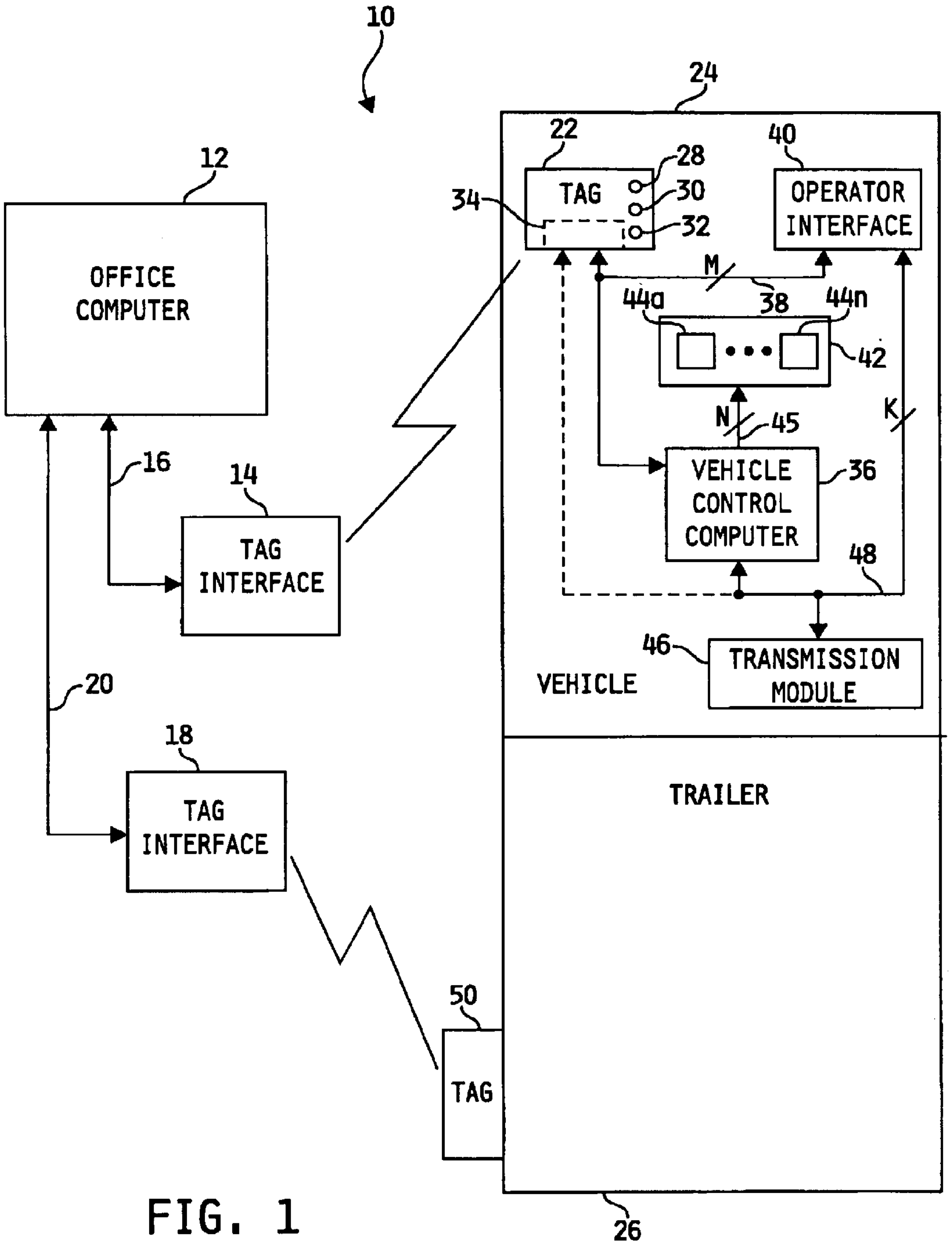
FIG. 1 is a diagrammatic illustration of one embodiment of a system for conducting wireless communications between a vehicle computer and a remote computer, in accordance with the present invention.

For the purposes of promoting an understanding of the principles of the invention, reference will now be made to one preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Referring now to FIG. 1, a system 10 for conducting wireless communications between a vehicle computer and a remote system, in accordance with the present invention, is shown. System 10 includes a remote system comprising an office or host computer coupled to a number of transceivers, wherein one or more of the transceivers are operable to communicate with one or more embedded vehicle computers via one or more transceivers associated with the vehicle. In system 10 illustrated in FIG. 1, an office or host computer 12 is electrically connected to a first tag interface unit or transceiver 14 via signal path 16 and is electrically connected to a second tag interface unit or transceiver 18 via signal path 20, wherein tag interface units 14 and 18 are configured to conduct communications with different types, or different configurations, of tags. It is to be understood, however, that although only two such tag interface units 14 and 18 are illustrated in FIG. 1, the present invention contemplates that computer 12 may be connected to any number of similarly and/or dissimilarly configured tag interface units so that data communications may be conducted with any such number of corresponding tags. Computer 12 may be any known computer operable to conduct and manage communications via one or more tag interface units. Computer 12 is preferably microprocessor-based and includes sufficient memory to store control algorithms and data to be downloaded to and from one or more computers embedded within vehicle 24. In one embodiment, computer 12 is a known personal computer (PC) including a microprocessor having at least the capabilities of a 386-type processor and preferably including a windows-based user interface. However, the present invention contemplates that computer 12 may be any known computer or computer system having at least the capability to control and manage communications and data exchange with one or more vehicle computers.

A first communications tag 22 is attached or affixed to a vehicle 24, wherein tag 22 is operable to communicate with tag interface unit 14 to thereby transfer data between computer 12 and one or more computer-controlled systems embedded within vehicle 24. In one embodiment, tag 22 includes a number of actuatable indicators, such as indicators 28, 30 and 32, and is configured for attachment to a windshield of the vehicle 24 so that indicators 28, 30 and 32 are visible to the vehicle operator. It is to be understood, however, that tag 22 may alternatively be attached or otherwise affixed to vehicle 24 at any suitable location, the importance of any such locating lying largely in the ability of tag 22 to communicate with tag interface unit 14, the visibility of indicators 28, 30 and 32 to the vehicle operator and the ability to interface tag 22 with one or more computers embedded within vehicle 24. In one embodiment, indicators 28, 30 and 32 are light-emitting diodes (LEDs) each preferably operable to emit a different color of visible radiation. For example, LED 28 may be configured to emit green light, LED 30 may be configured to emit red light and LED 32 may be configured to emit yellow light. It is to be understood, however, that tag 22 may include any number of LEDs or other illumination sources operable to emit any number of different or similar light colors.

In any case, tag 22 includes a computer 34, that is preferably microprocessor-based and includes, or has access to, sufficient memory, wherein computer 34 is electrically connected to a vehicle control computer 36 via a number M of signal paths 38, wherein M may be any integer. Vehicle control computer 36 is operable to control and manage the overall operation of an internal combustion engine (not shown) carried by the vehicle 24. In one embodiment, signal paths 38 comprise a communications bus or so-called datalink that is configured in accordance with SAE J1708 specifications for communications in accordance with SAE J1587 communications protocol, although the present invention contemplates that signal paths 38 may alternatively be any other suitable signal path for transmitting information between computer 34 and control computer 36.

Signal paths 38 are also electrically connected to an operator interface unit 40 which is preferably located within the cab area of the vehicle for access thereto by the vehicle operator. As it relates to the present invention, interface unit 40 preferably includes an auxiliary computer that is electrically connected to signal paths 38 and is further coupled to a display unit. Office computer 12 may be operable in one embodiment of the present invention to provide messages on the display unit of operator interface unit 40 to thereby provide visual feedback to the vehicle operator relating to the status of the wireless communications between control computer 12 and one or more of the onboard vehicle computers. Additionally or alternatively, office computer 12 may be operable to provide messages on the display unit of interface unit 40 which relate to the vehicle operator (e.g., personal messages, driver reward or warning messages, etc.).

Vehicle control computer 36 is further connected to a known instrument panel of the vehicle via a number N of signal paths 45, wherein N may be any integer. As it relates to the present invention, instrument panel 42 includes a number of illumination devices 44*a*, . . . ,44*n*, wherein control computer 36 is operable to provide visual feedback to the vehicle operator as is known in the art. In one embodiment, one or more of the illumination devices 44*a*, . . . , 44*n* may be existing illumination devices, such as warning lamps (check engine, low oil pressure, etc.) and the like. Alternatively, one or more of the illumination devices 44*a*, . . . , 44*n* may be added to the instrument panel for purposes of the present invention. In either case, office computer 12 may be operable in one embodiment of the present invention to control activation/deactivation of one or more of the illumination devices 44*a*, . . . , 44*n* to thereby provide visual feedback to the vehicle operator relating to the status of the wireless communications between control computer 12 and one or more of the onboard vehicle computers.

Vehicle 24 further includes a transmission control module 46 associated with a transmission (not shown) operatively coupled to an internal combustion engine (not shown) carried by the vehicle. Transmission control module 46 includes a transmission control computer electrically connected to vehicle control computer 36 via a number K of signal paths 48, wherein K may be any integer. Signal paths 48 are also electrically connected to the auxiliary computer of operator interface unit 40. Alternatively, or in addition, to the signal paths 38, tag control computer 34 may be connected to signal paths 48 as shown by the dashed line in FIG. 1. Signal paths 48 preferably comprise a multi-wire data communications path such as an SAE J1939 datalink, although the present invention contemplates that signal path 48 may alternatively be any other suitable signal path for transmitting information between the transmission control computer and control computer 36. Much of the engine/vehicle operational data available to control computer 36 is thus available to transmission module 46, and transmission operational data available to module 46 is likewise available to control computer 36, via datalink 48. The J1939 datalink differs from the J1708 datalink in many respects. As it relates to the present invention, however, one primary difference is that the J1939 datalink is operable to transfer information at a much faster rate (i.e. 115 k-bytes/sec baud rate as compared to 9.6 k-bytes/sec baud rate for the J1587 protocol). Accordingly, data may be transferred, via tag computer 34, to/from any of the onboard computers at a much faster rate over the J1939 datalink than over the J1708 datalink.

A trailer 26 may be connected to vehicle 24 in a known manner, and trailer 26 may include a second tag 50 attached thereto. In one embodiment, tag 50 is not connected to any computer-controlled system onboard trailer 26 and instead includes only information relating to the trailer itself (e.g., trailer identification code, etc.). In this case, tag 50 is a different type of tag than tag 22 and tag interface unit 14 is configured to communicate with tag 22 but not with tag 50. Likewise, tag interface unit 18 is configured to communicate with tag 50 but not with tag 22. Alternatively, tag 50 may be configured similarly to tag 22 and may further be electrically connected to a computer-controlled system onboard trailer 26. Examples of such computer-controlled systems may include, but are not limited to, anti-lock brake systems, climate control units, suspension control systems, and the like. In this embodiment, tag interface unit 18 may be configured similarly to tag interface unit 14. Alternatively, tag interface unit 18 may be omitted and tag interface unit 14 may be operable to communicate with tag 22 and tag 50 as each passes thereby. Other tag/interface unit combinations will occur to those skilled in the art, and such combinations are intended to fall within the scope of the present invention.

Figure 2:
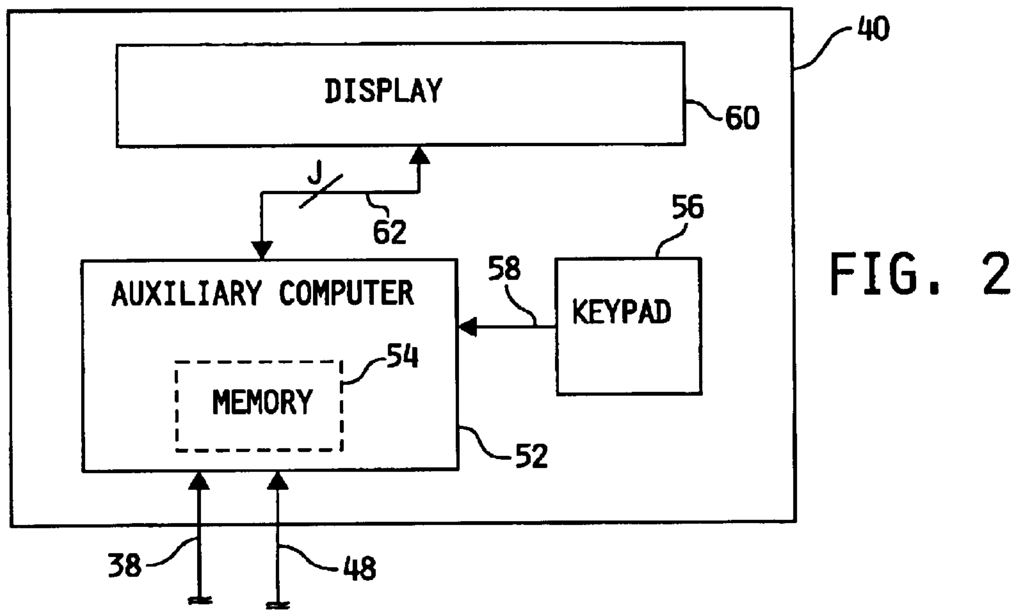
FIG. 2 is a diagrammatic illustration of one embodiment of some of the internal features of the operator interface unit shown in FIG. 1.

Referring now to FIG. 2, one preferred embodiment of an operator interface unit 40, in accordance with the present invention, is shown. Unit 40 includes an auxiliary computer 52 having a memory portion 54, wherein computer 52 is preferably a known microprocessor-based computer. Computer 52 is connected to signal paths 38 and 48 as described hereinabove. Unit 40 preferably includes a keypad or other operator control panel 56 electrically connected to auxiliary computer 52 via signal path 58. A display unit 60 is electrically connected to auxiliary computer 52 via a number J of signal paths 62 wherein J may be any integer. As an alternative, or in addition, to keypad 56, display unit 60 may include a number of touch-screen selectors operable to provide auxiliary computer 52 with operator requested instructions/information as is known in the art. Keypad 56 is preferably used to configure and otherwise communicate with module 40, but in accordance with the present invention, may be used to send requests/instructions to and otherwise provide a means for operator communication with office computer 12, as will be described in greater detail hereinafter. In any case, auxiliary computer 52 may be operable to collect information relating to engine/vehicle and/or transmission operation via datalinks 38 and/or 48. Examples of such information include, but are not limited to, trip information, fuel usage information, etc., and an example of one such operator interface unit 40 suitable for use with the present invention in this capacity is given in U.S. Pat. No. 5,303,163 to Ebaugh et al., which is assigned to the assignee of the present invention, and the contents of which are incorporated herein by reference. Additionally, or alternatively, display unit 60 may be configured to display at least textual (and possibly graphical) information, wherein office computer 12 is operable to provide such information to auxiliary computer 52 for display on unit 60 as described hereinabove.

Figure 3:
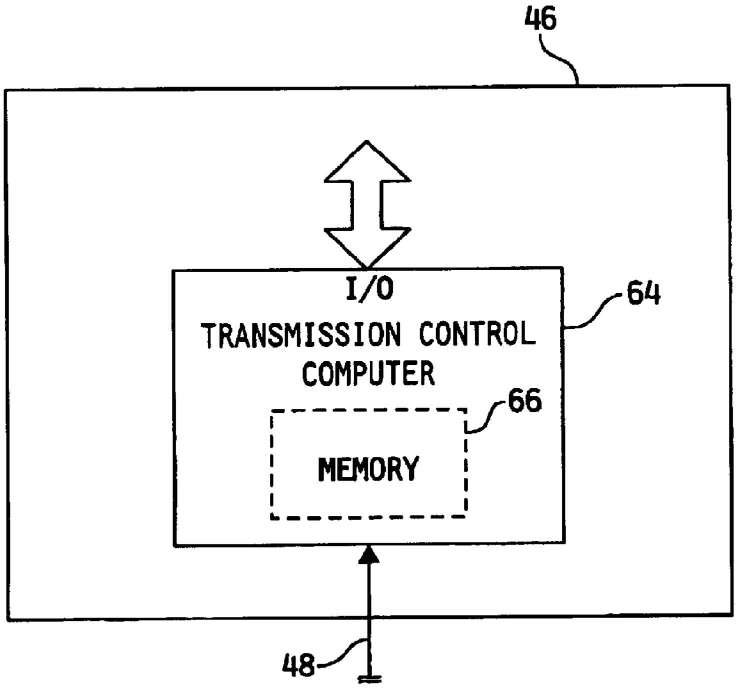
FIG. 3 is a diagrammatic illustration of one embodiment of some of the internal features of the transmission control unit shown in FIG. 1.

Referring now to FIG. 3, one embodiment of transmission control module 46 is shown and includes a transmission control computer 64 having a memory portion 66, wherein control computer 64 is electrically connected to signal paths 48 as described hereinabove. Transmission control computer 64 is operable to control and manage the overall operation of the vehicle transmission (not shown) in accordance with transmission operational information provided thereto via input/output port I/O and also in accordance with engine/vehicle operating information provided thereto via signal paths 48. Transmission operating information and/or engine/vehicle operating information may be provided to interface module 40 for data collection and/or display on display unit 60.

In the operation of communications system 10, office computer 12 is operable to establish communications and exchange data with one or more of the computers 36, 52 and/or 64 embedded within vehicle 24 via tag interface unit 14 and tag 22. In one preferred embodiment, tag interface units 14 and 18 are operable in a "search" mode to continuously transmit radio frequency control signals. As vehicle 24 approaches the radio frequency fields of tag interface units 14 and 18, tags 22 and 50 are responsive to detection of such fields to transmit information back to tag interface units 14 and 18 to thereby establish communications between the respective tag and computer 12. Thus, for example, as tag 22 approaches the radio frequency field of tag interface unit 14, tag computer 34 is operable to detect such a field in a known manner and transmit acknowledgement information back to office computer 12 via tag interface unit 14 to thereby establish communications between computer 34 and office computer 12. Office computer 12 is then operable to transmit information to, and extract information from, vehicle control computer 36, operator interface computer 52 and/or transmission control computer 64 via datalink 38 and/or datalink 48. One embodiment of tag 22 setting forth some of the details thereof relating to communications with office computer 12 is described in co-pending U.S. patent application Ser. No. 09/173,978 filed by Curtis L. Carrender et al. and entitled AN ELECTRONIC TAG INCLUDING RF MODEM FOR MONITORING MOTOR VEHICLE PERFORMANCE, the contents of which are incorporated herein by reference. However, the present invention contemplates other embodiments of tag 22 and tag interface unit 14 wherein communications therebetween may be established in accordance with other known communication techniques.

In any case, once communications are established between office computer 12 and computer 34 of tag 22, office computer 12 has access to any of the computers 36, 52 and 64 via datalink 38 and/or datalink 48. Office computer 12 may accordingly extract engine/vehicle/transmission operational and diagnostic information from any of these onboard computers and further provide programming and calibration data to any one or more of the onboard computers while communications between tag interface unit 14 and tag computer 34 are established. Examples of information extracted by office computer 12 include, but are not limited to, trip information (e.g. miles traveled, fuel used, etc.), accumulated braking events, time in top gear, gear shifting information, engine/vehicle acceleration information, fluid temperature information, and other operating and/or diagnostic information.

Preferably, office computer 12 is operable during such data exchange to provide visual feedback to the vehicle operator relating to status of the communications. In one embodiment, office computer 12 is operable to provide such visual feedback by controlling the status of one or more of the illumination devices 28, 30 and 32 of tag 22. Alternatively, or additionally, control computer 12 may be operable to provide such visual feedback by controlling activation/deactivation (e.g. sequencing) of one or more of the illumination devices 44*a*, . . . , 44*n* within instrument panel 42. Alternatively, or additionally, control computer 12 may be operable to provide such visual feedback and/or other textual and/or graphical information to the vehicle operator by controlling display 60 of operator interface unit 40. Control of other illumination devices, alphanumeric displays, graphical displays, audio sources, audio-visual sources and the like is contemplated by the present invention in providing visual information to the vehicle operator.

Figure 4:
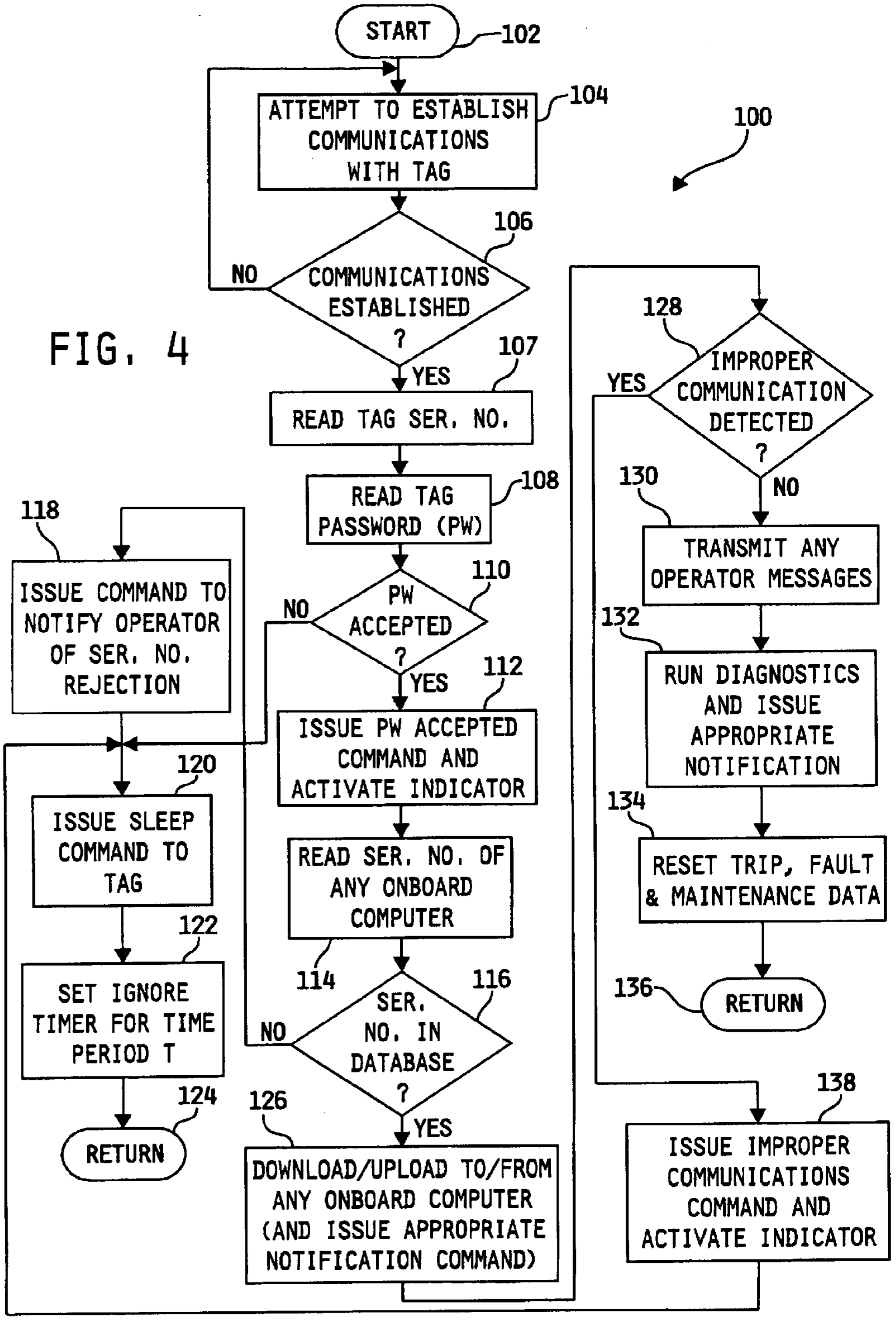
FIG. 4 is a flowchart illustrating one embodiment of a software algorithm for managing communications between the vehicle computer and remote computer shown in the system of FIG. 1.

Referring now to FIG. 4, a flowchart is shown illustrating one preferred embodiment of a software algorithm 100 for managing communications between office computer 12 and one or more of the computers onboard vehicle 24. Algorithm 100 is executable by office computer 12, whereby computer 12 is operable to control data exchange with any of computers 36, 52 and/or 64. Algorithm 100 begins at step 102 and at step 104, office computer 12 is operable to attempt to establish communications with one or more tags, such as tag 22, onboard vehicle 24. Preferably, office computer 12 is operable to execute step 102 by controlling tag interface unit 14 to continuously transmit a radio frequency field as described hereinabove. Thereafter at step 106, office computer 12 is operable to determine whether communications has been established with an onboard system. If a tag, such as tag 22, is within the radio frequency field of tag interface unit 14, tag computer 34 is operable to transmit acknowledgement information back to tag interface unit 14, whereby office computer 12 is operable to interpret such acknowledgement information as establishment of communications between computers 12 and 34. If office computer 12 determines at step 106 that such communications have been established, algorithm execution continues at step 107. If, however, office computer 12 determines at step 106 that communications with an onboard system have not been established, algorithm execution continues at step 104 where office computer 12 continues to monitor tag interface unit 14 for an appropriate communications source.

At step 107, office computer 12 is operable to read a serial number transmitted thereto by tag computer 34, wherein the serial number is preferably a unique code identifying the particular tag 22. Thereafter at step 108, office computer 12 is operable to read a password transmitted thereto by tag computer 34, wherein the password may be common to more than one tag. At step 110, office computer 12 is operable to determine whether the password transmitted by tag computer 34 properly identifies tag 22 as being of the appropriate type for communicating with one or more of the onboard computers 36, 52 and 64. If office computer 12 determines that the password is acceptable at step 110, algorithm execution continues at step 112 where office computer 12 issues a password accepted command. In one embodiment, tag computer 34 is responsive to the password accepted command issued by office computer 12 to illuminate one of the illumination devices 28, 30 or 32 (e.g. a red LED). Alternatively, tag computer 34 is operable to forward the password accepted command to one of the onboard computers 36, 52 or 64 for further processing. For example, tag computer 34 may forward the password accepted command to vehicle control computer 36, wherein computer 36 is operable to illuminate one or more of the illumination devices 44*a*, . . . , 44*n* of instrument panel 42. As another example, tag computer 34 may forward the password accepted command to operator interface computer 52, wherein computer 52 is operable to display a message on display unit 60 indicating that the password has been accepted and/or that communications between office computer 12 and the onboard system is underway. In any case, one or more of the onboard computers 36, 52 or 64, or the tag computer 34, are operable to activate an appropriate indicator to thereby provide the vehicle operator with information indicating that the tag password was accepted and communications between office computer 12 and the onboard system is currently underway.

If, at step 110, office computer 12 determines that the password transmitted by the tag computer 34 is not acceptable, algorithm execution continues at step 120 where office computer 12 issues a sleep command to tag computer 34. Tag computer 34 is preferably responsive to the sleep command to inhibit radio frequency communications with a tag interface unit, such as unit 14, for some predefined time period. Thereafter at step 122, office computer 12 is operable to set an ignore timer internal to computer 12 for some predefined time period T, wherein T is preferably programmable by the user. During the time period T that the ignore timer is active, office computer 12 is preferably operable to ignore any communication attempts made by a tag bearing the serial number determined at step 107. Thereafter at step 124, algorithm 100 is returned to its calling routine. Alternatively, step 122 may loop to step 104 for continuous operation of algorithm 100.

After office computer 12 issues a password accepted command at step 112, algorithm execution continues at step 114 where office computer 12 is operable to read a serial number or other identification code of any one of the onboard computers 36, 52 and/or 64. In one embodiment, office computer 12 is operable at step 114 to read a serial number of the vehicle control computer 36, wherein control computer 36 is responsive to an appropriate request from computer 12 to transmit the serial number information to tag computer 34 over datalink 38 or 48. Tag computer 34 is, in turn, operable to transmit the serial number to office computer 12 via the radio frequency communications link between tag 22 and tag interface unit 14. Thereafter at step 116, office computer 12 is operable to compare the serial number with a serial number database resident therein. If office computer 12 determines that the serial number matches one in its database, algorithm execution continues at step 126 where office computer 12 is operable to download and/or upload information to/from any of the onboard computers 36, 52 and 64 as described hereinabove. In one embodiment, office computer 12 is further operable at step 126 to issue an appropriate command to notify the vehicle operator that office computer 12 is downloading/uploading information. For example, office computer 12 may issue such a command to operator interface computer 52, wherein computer 52 is responsive to the command to display a suitable message on display unit 60 indicative of the downloading/uploading operation.

If, at step 116, office computer 12 determines that the serial number read at step 114 is not found in its serial number database, algorithm execution continues at step 118 where office computer 12 issues a command to notify the vehicle operator that the serial number was rejected. In one embodiment, tag computer 34 is responsive to such a command to deactivate the communications indicator (e.g. red LED) and activate another one of the indicators 28, 30 and 32 (e.g. yellow LED). Alternatively or additionally, control computer 36 may be responsive to the serial number rejected command to illuminate one or more of the illumination devices 44*a*, . . . , 44*n* of instrument panel 42. Alternatively or additionally still, operator interface computer 52 may be responsive to the serial number rejected command to display a suitable message on display unit 60.

In any case, algorithm execution continues from step 118 at steps 120 and 122 where office computer 12 is operable to issue a sleep command to tag computer 34 and set its internal ignore timer as described hereinabove.

Algorithm execution continues from step 126 at step 128 where office computer is operable to determine whether communications between computer 12 and tag computer 34 are properly occurring. If office computer 12 determines that such communications are improper for any reason (e.g. corrupt data signals, etc.), algorithm execution continues at step 138 where office computer 12 is operable to issue an improper communications command. In one embodiment, tag computer 34 is responsive to the improper communications command to repeatedly activate and deactivate one of the indicators 28, 30 or 32 (e.g. the red LED) at some predetermined rate. Alternatively or additionally, control computer 36 may be responsive to the improper communications command to activate one or more of the illumination devices 44*a*, . . . , 44*n* of instrument panel 42 in a similar fashion. Alternatively or additionally still, operator interface computer 52 may be responsive to the improper communications command to display an appropriate message on display unit 60. In any case, algorithm execution continues from step 138 to step 120 where office computer 12 is operable to issue a sleep command to tag computer 34 and set its internal ignore timer as described hereinabove.

If office computer 12 detects no improper communications at step 128, algorithm execution continues at step 130 where office computer 12 is operable to transmit any operator information to operator interface computer 52 for display on display unit 60. Examples of such operator information may include, but are not limited to, personal messages (e.g. telephone home), operator reward or warning messages (e.g. vehicle operational or monetary reward for efficient operation of the vehicle), and the like. Preferably, office computer 12 is operable to execute steps 128 and 130 while executing step 126, and to further execute step 130 after execution of step 126, wherein computer 12 may make, for example, driver reward/warning determinations based on information downloaded from one or more of the onboard computers 36, 52 and 64. In any case, algorithm execution continues from step 130 at 132 where office computer 12 is operable to run diagnostics routines and issue appropriate notification commands. For example, office computer 12 may be operable at step 132 to read a trailer identification code from tag 50 via tag interface unit 18 and compare the trailer identification code to the serial number read at step 114. If computer 12 determines from this information that the trailer 26 is not supposed to be associated with that particular vehicle 24, computer 12 is operable to issue an appropriate command to notify the vehicle operator according to any one or more of the techniques described hereinabove. Other examples will occur to those skilled in the art, and such examples are intended to fall within the scope of the present invention.

In any case, algorithm execution continues from step 132 at step 134 where office computer 12 is operable to reset trip, fault and maintenance information within any one or more of the onboard computers 36, 52 and 64. Preferably, computer 12 is further operable at step 134 to issue an appropriate command to notify the vehicle operator that information exchange is complete according to any one or more of the techniques described hereinabove. For example, in one embodiment, tag computer 34 is responsive to such a command to deactivate one of the indicators 28, 30 and 32 and activate another one of the indicators 28, 30 and 32 (e.g. deactivate the red LED and activate a green LED). Algorithm execution continues from step 134 at step 136 were algorithm execution returns to its calling routine. Alternatively, step 134 may loop back to step 104 for continuous operation of algorithm 100.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected.

What is claimed is:

1. A system for conducting wireless communications between a remote system and a computer embedded within a vehicle, comprising:

a first communications tag mounted to a vehicle and having a first computer configured for radio frequency communications;

a second communications tag mounted to a trailer and having a second computer configured for radio frequency communications;

a third computer embedded within said vehicle and electrically connected to said first computer;

a remote computer operable to establish a first radio frequency communications link with said first computer and to establish a second radio frequency communications link with said second computer, said remote computer extracting a serial number from said third computer via said first radio frequency communications link and extracting a trailer identification code from said second computer via said second radio frequency communications link, said remote computer comparing said serial number with said trailer identification code and transmitting an incompatibility signal via said first radio frequency communications link if said serial number and said trailer identification code are incompatible; and means associated with said vehicle and responsive to said incompatibility signal for providing notification of said vehicle and trailer incompatibility.

2. The system of claim 1 further including a first tag interface unit operatively connected to said remote computer, said remote computer establishing said first radio frequency communications link between said first tag interface unit and said first computer.

3. The system of claim 2 further including a second tag interface unit operatively connected to said remote computer, said remote computer establishing said second radio frequency communications link between said second tag interface unit and said second computer.

4. A method of monitoring wireless communications between a computer embedded within a vehicle and coupled to a communications tag, and a remote computer coupled to a tag interface unit, the method comprising the steps of:

establishing a wireless communications link between the tag interface unit and the communications tag;

providing a serial number of the embedded computer to the remote computer via the wireless communications link; and activating a first notification device associated with the vehicle if the remote computer determines that the serial number is included within a serial number database, wherein activation of the first notification device indicates that information exchange between the embedded computer and the remote computer is enabled.

5. The method of claim 4 further including the step of activating a second notification device associated with the vehicle if the remote computer determines that the serial number is not included within the serial number database, wherein activation of the second notification device indicates that information exchange between said embedded computer and said remote computer is not enabled.

6. The method of claim 5 further including the step of commanding a tag computer associated with the communications tag to enter a communications inhibiting sleep mode to disable wireless communications between the communications tag and the remote computes if the remote computer determines that the serial number is not included within the serial number database.

7. The method of claim 6 further including the step of ignoring any attempts by the tag computer to establish wireless communications with the remote computer for a predefined time interval after commanding the tag computer to enter the sleep mode.

8. System for monitoring wireless communications between a first computer embedded within a vehicle and a remote computer, the system comprising:

a communications tag mounted to said vehicle and coupled to said first computer;

a tag interface unit coupled to said remote computer, said remote computer establishing a wireless communications link between said tag interface unit and said communications tag, said remote computer determining whether a serial number of said first computer is included within a serial number database and transmitting a first command via said communications link if said serial number is included within said serial number database;

a first indicator associated with said vehicle; and means responsive to said first command for activating said first indicator, wherein activation of said first indicator indicates that information exchange between said first computer and said remote computer is enabled.

9. The system of claim 8 further including a second indicator;

and wherein said remote computer is operable to transmit a second command via said wireless communications link if said serial number is not included within said serial number database, said means responsive to said first command further responsive to said second command for activating said second indicator, wherein activation of said second indicator indicates that information exchange between said first computer and said remote computer is not enabled.

10. The system of claim 9 further including a tag computer associated with said communications tag, said tag computer responsive to said second command to enter a communications inhibiting sleep mode to disable wireless communications between said communications tag and said remote computer.

11. The system of claim 10 wherein said remote computer is operable to ignore any attempts by said tag computer to establish wireless communications with said remote computer for a predefined time period following transmission of said second command.

12. The system of claim 10 wherein said means responsive to said first command for activating said first indicator is said tag computer.

13. The system of claim 10 further including a data link connecting said first computer with said tag computer, said tag computer transmitting said first and second commands to said first computer via said data link.

14. The system of claim 13 wherein said data link is a SAE J1587 data link.

15. The system of claim 13 wherein said data link is a SAE J1939 data link.

16. The system of claim 8 wherein said first computer is operable to transmit said serial number to said remote computer via said wireless communications link.

17. The system of claim 8 wherein said means responsive to said first command for activating said first indicator is said first computer.

* * * * *